United States Patent
Johnson

(10) Patent No.: US 7,810,787 B2
(45) Date of Patent: Oct. 12, 2010

(54) ANIMAL WATERING VALVE HAVING ELASTOMERIC DIAPHRAGM

(75) Inventor: Paul S. Johnson, St. Francis, WI (US)

(73) Assignee: Edstrom Industries, Inc., Waterford, WI (US)

(*) Notice: Subject to any disclaimer, the term of this patent is extended or adjusted under 35 U.S.C. 154(b) by 817 days.

(21) Appl. No.: 11/379,842

(22) Filed: Apr. 24, 2006

(65) Prior Publication Data

US 2007/0245969 A1    Oct. 25, 2007

(51) Int. Cl.
*F16K 31/00* (2006.01)
*A01K 7/00* (2006.01)

(52) U.S. Cl. .................. 251/339; 119/72.5; 119/75

(58) Field of Classification Search .............. 251/339, 251/335.1, 335.2; 19/75, 72, 74, 78, 72.5
See application file for complete search history.

(56) References Cited

U.S. PATENT DOCUMENTS

| | | | |
|---|---|---|---|
| 2,710,594 A | 6/1955 | Thompson | |
| 2,939,424 A | 6/1960 | Fredericksen | |
| 3,256,917 A | 6/1966 | Baumann et al. | |
| 3,513,811 A * | 5/1970 | Graham | 119/72.5 |
| 3,550,560 A * | 12/1970 | Edstrom | 119/72.5 |
| 3,698,685 A | 10/1972 | Lang | |
| 4,006,716 A | 2/1977 | Cross | |
| 4,187,804 A | 2/1980 | Von Taschitzki | |
| 4,258,666 A | 3/1981 | Edstrom | |
| 4,320,891 A | 3/1982 | Cairns | |
| 4,391,225 A | 7/1983 | Sparks | |
| 4,403,570 A | 9/1983 | Freehafer | |
| 4,406,253 A | 9/1983 | Atchley et al. | |
| 5,065,700 A | 11/1991 | Cross | |
| 5,074,250 A | 12/1991 | Clark, IV | |
| 5,329,877 A | 7/1994 | Schumacher | |
| 5,373,811 A | 12/1994 | Wastell | |
| 5,501,177 A | 3/1996 | Edstrom | |
| 5,816,194 A | 10/1998 | Huff | |
| 6,739,283 B1 | 5/2004 | Lin | |
| 6,912,971 B1 | 7/2005 | Chalk | |
| 6,941,893 B2 | 9/2005 | Gabriel et al. | |
| 6,983,721 B2 | 1/2006 | Gabriel et al. | |

* cited by examiner

*Primary Examiner*—Stephen Hepperle
*Assistant Examiner*—Andrew J Rost
(74) *Attorney, Agent, or Firm*—Boyle Fredrickson, S.C.

(57) ABSTRACT

An animal watering valve has an elastomeric diaphragm disposed in a bore of a housing upstream of a valve seat and having apertures formed therethrough for the passage of water. A valve stem has a head clamped between the diaphragm and the valve seat and a tail that is laterally deflectable to move the valve stem head relative to the diaphragm from a seated position. Upon moving it to an unseated position, the valve stem head pivots relative to the valve seat to permit water to flow out of the valve. At least portions of the flow aperture outlets in the diaphragm are located radially inwardly of and axially upstream of the upstream surface of the valve stem head.

18 Claims, 10 Drawing Sheets

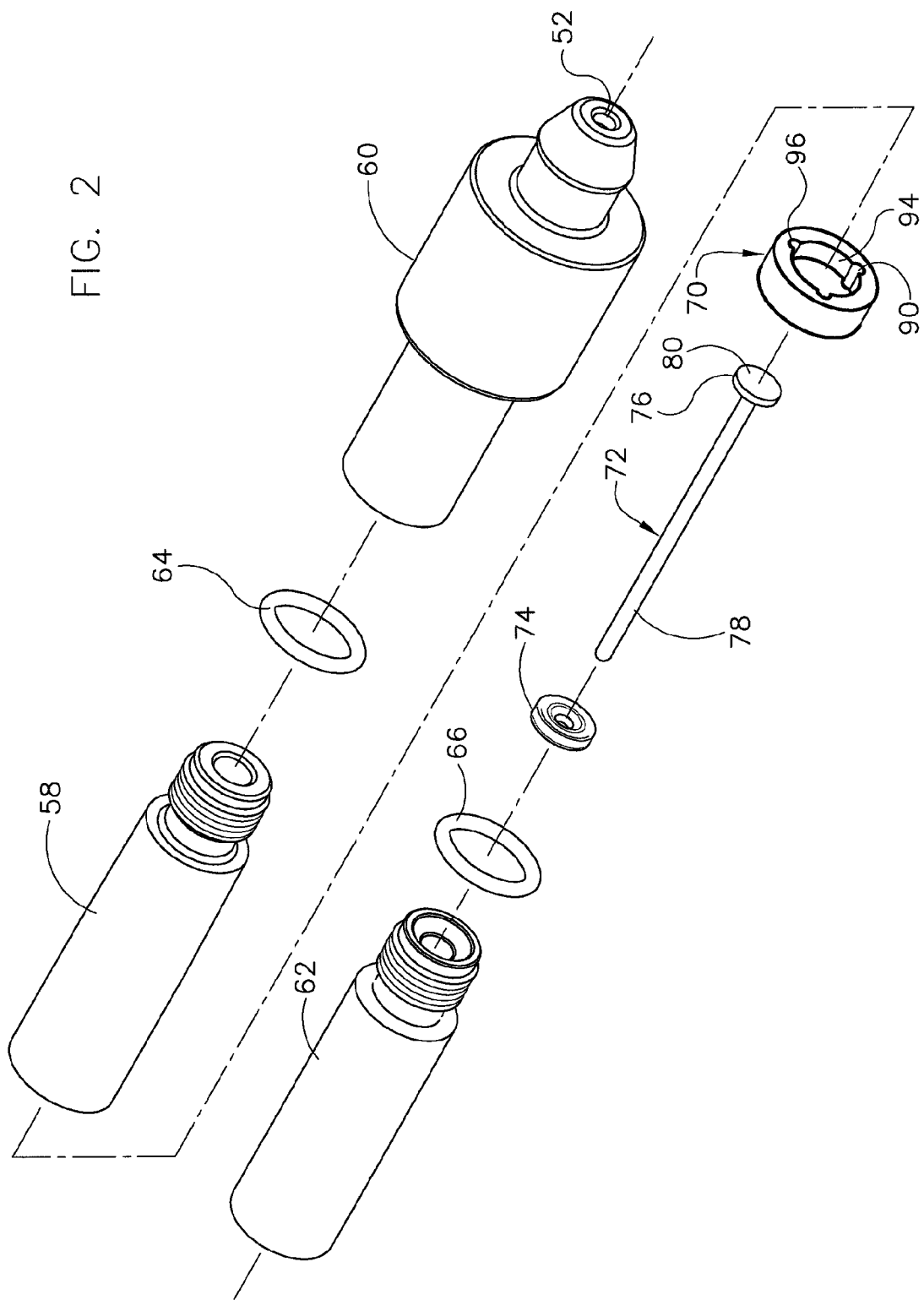

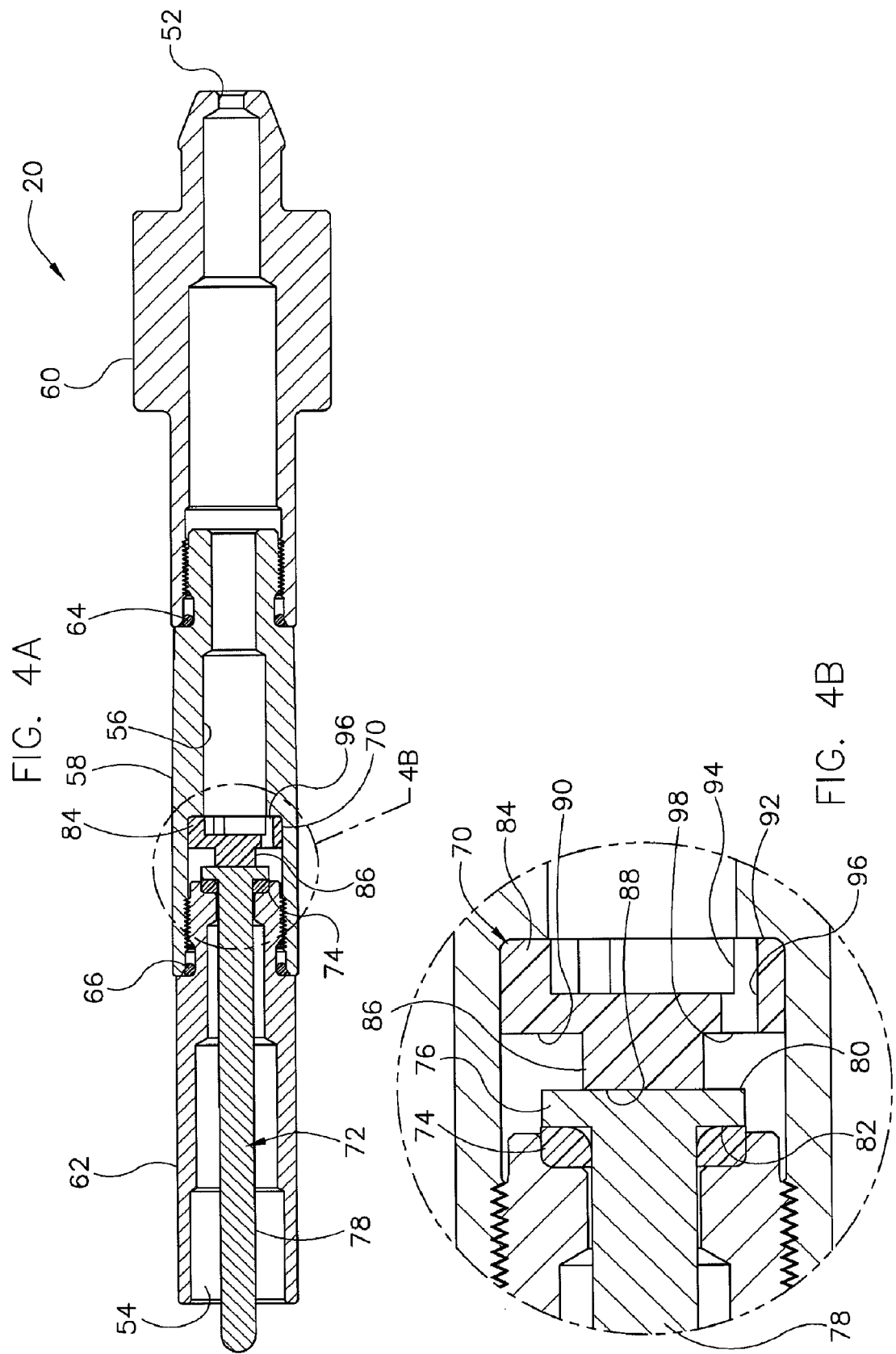

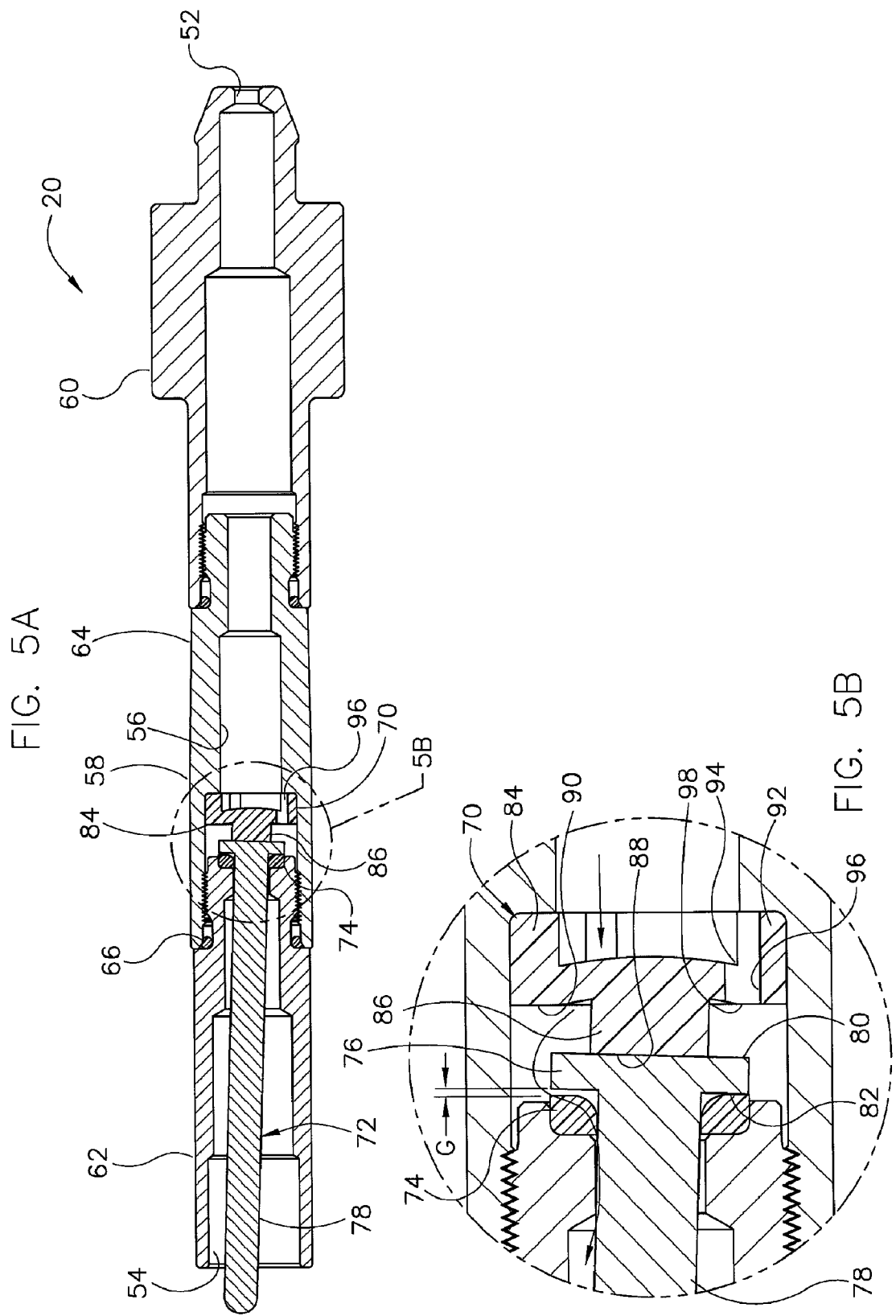

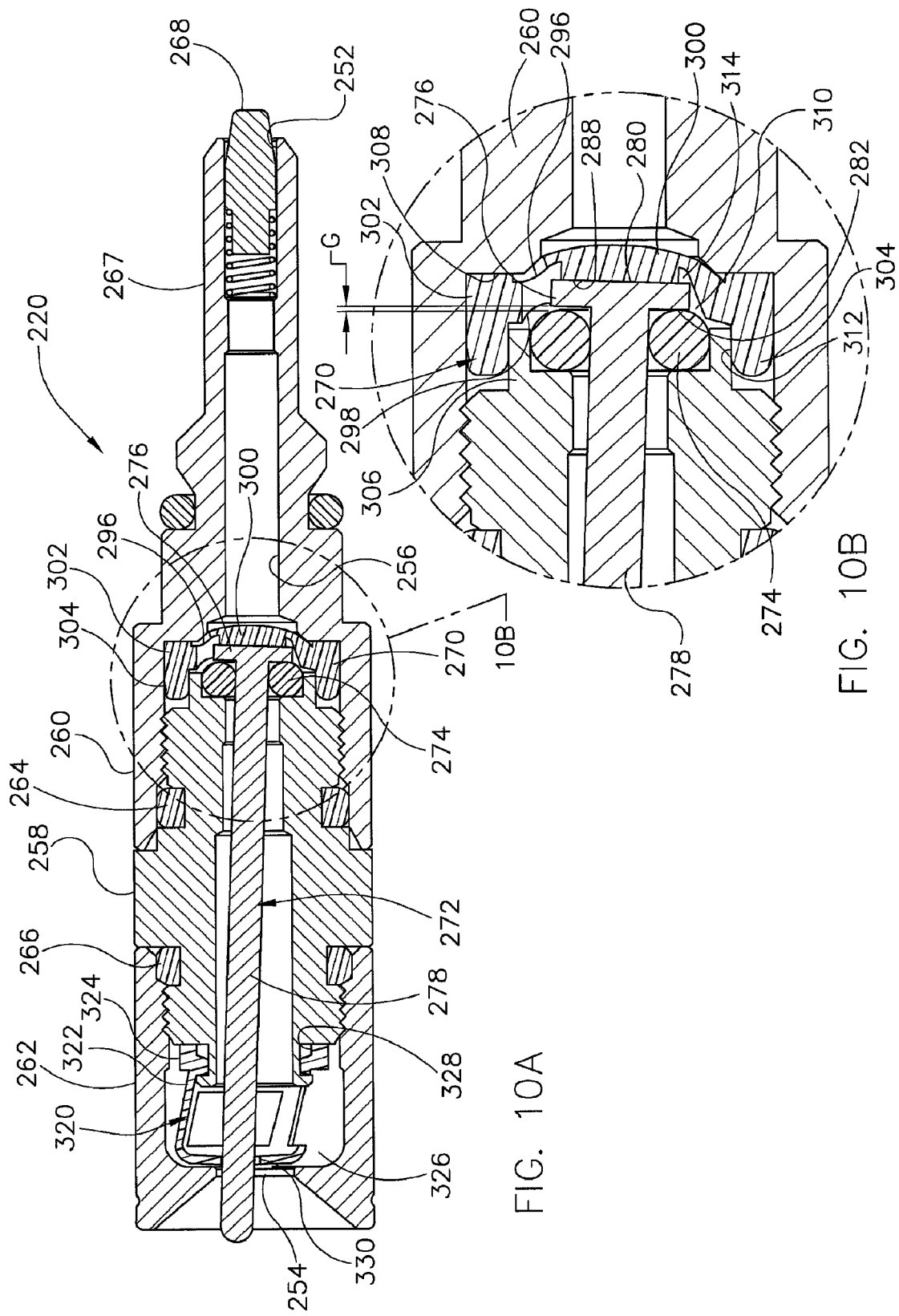

ANIMAL WATERING VALVE HAVING ELASTOMERIC DIAPHRAGM

BACKGROUND OF THE INVENTION

1. Field of the Invention

The invention relates to animal watering valves and, more particularly, relates to animal actuated valves for use by mice, rats, and other relatively small laboratory animals or commercially raised animals.

2. Discussion of the Related Art

Animal actuated watering valves are well known. One such valve is disclosed in U.S. Pat. No. 5,501,177, which issued to Edstrom on Mar. 26, 1996 (the Edstrom patent). The valve disclosed in the Edstrom patent employs a housing having an inlet and an outlet connected by an elongated longitudinal bore, a valve element located adjacent the inlet, and an elongated actuating lever or valve stem which extends through the bore, which projects out of the outlet, and which, when deflected by an animal, opens the valve element to permit the passage of fluid through the valve housing. A movable elastomeric boot is provided adjacent the outlet to inhibit the animal from stuffing bedding material or other debris into the outlet and thus inhibits the valve from being unintentionally lodged in its open position.

The valve element disclosed in the Edstrom patent includes a head on the valve stem which is resiliently biased against a valve seat by an elastomeric diaphragm. The valve seat takes the form of an elastomeric ring against which a downstream surface of the valve stem head abuts. The diaphragm is formed from a unitary elastomeric element including a central web portion and a cylindrical peripheral portion. The web portion has apertures formed therethrough for the passage of fluid, and also has a recess counterbored into the downstream surface thereof for receiving a head of the valve stem. A downstream end of the outer peripheral portion is clamped in place within the housing, and an upstream, second end engages a shoulder on the valve cap.

The diaphragm disclosed in the Edstrom patent works very well but exhibits some disadvantages. For instance, flow tends to be inconsistent with the direction and/or extent of valve stem deflection because the gap between the head of the valve stem and the valve seat is relatively small—even when the valve stem is deflected its maximum amount. Flow consistency is also reduced by the fact that the outlet ports are located peripherally outboard of the valve stem head, leading to water flow from the ports into the downstream sections of the valve to take the form in distinct streams of unequal volume. In addition, because the entire upstream surface of the valve stem head rests on the diaphragm, the forces required to deflect the valve stem increase exponentially with stem deflection—which can be a hindrance to small or weak animals.

The need therefore has arisen to provide a diaphragm-type animal watering valve having improved flow consistency when compared to existing animal watering valves.

The need has additionally arisen to provide a diaphragm-type animal watering valve that is easier to operate than existing animal watering valves.

SUMMARY OF THE INVENTION

In accordance with a first aspect of the invention, an animal watering valve is provided that includes a housing having an upstream inlet and a downstream outlet. The housing supports a valve seat, an elastomeric diaphragm, and a valve stem. The elastomeric diaphragm is disposed in the bore upstream of the valve seat and includes a perforated portion having apertures formed therethrough that having outlets, and a seat portion having a valve stem head abutment surface. A valve stem is located in the bore and extends from the diaphragm toward the outlet. The valve stem has a head that is clamped between the diaphragm and the valve seat and a tail that is laterally deflectable to move the valve stem head relative to the diaphragm from a seated position. Upon moving it to an unseated position, the valve stem head seals against the valve seat to prevent water flow though the valve to an unseated position in which the valve stem head pivots relative to the valve seat to permit water flows through the apertures of the diaphragm, between the valve stem head and the valve seat, and out of the valve, the valve stem head having an upstream surface that abuts the seat portion. At least portions of the flow aperture outlets in the diaphragm are located radially inwardly of and axially upstream of the upstream surface of the valve stem head.

In one exemplary embodiment, the diaphragm includes a body through which the apertures extend and a radially central protrusion which extends axially downstream from a downstream surface of the body to the valve stem head abutment portion.

In another exemplary embodiment, the diaphragm includes a perforated web portion having a downstream surface which presents the seat portion and which has apertures formed therethrough, and a cylindrical peripheral portion which extends axially downstream from the web portion and which clamped in place within the valve housing. An annular channel may be formed in the perforated web portion of the diaphragm around an outer radial periphery of the seat portion and connects the outlets of said apertures to one another.

Other features and advantages of the present invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout and in which:

FIG. 2 is an exploded perspective view of the animal watering valve of FIG. 1;

FIG. 4A is a sectional side elevation view of the animal watering valve of FIGS. 1 and 2, illustrating the valve in its seated or closed position;

FIG. 4B is an enlarged fragmentary view of a portion of FIG. 4A;

FIGS. 5A and 5B correspond to FIGS. 4A and 4B, respectively, and illustrate the animal watering valve in its unseated or open position;

FIGS. 10A and 10B correspond to FIGS. 9A and 9B, respectively, and illustrate the animal watering valve in its unseated or open position.

DETAILED DESCRIPTION OF THE PREFERRED EMBODIMENTS

Figure 1:
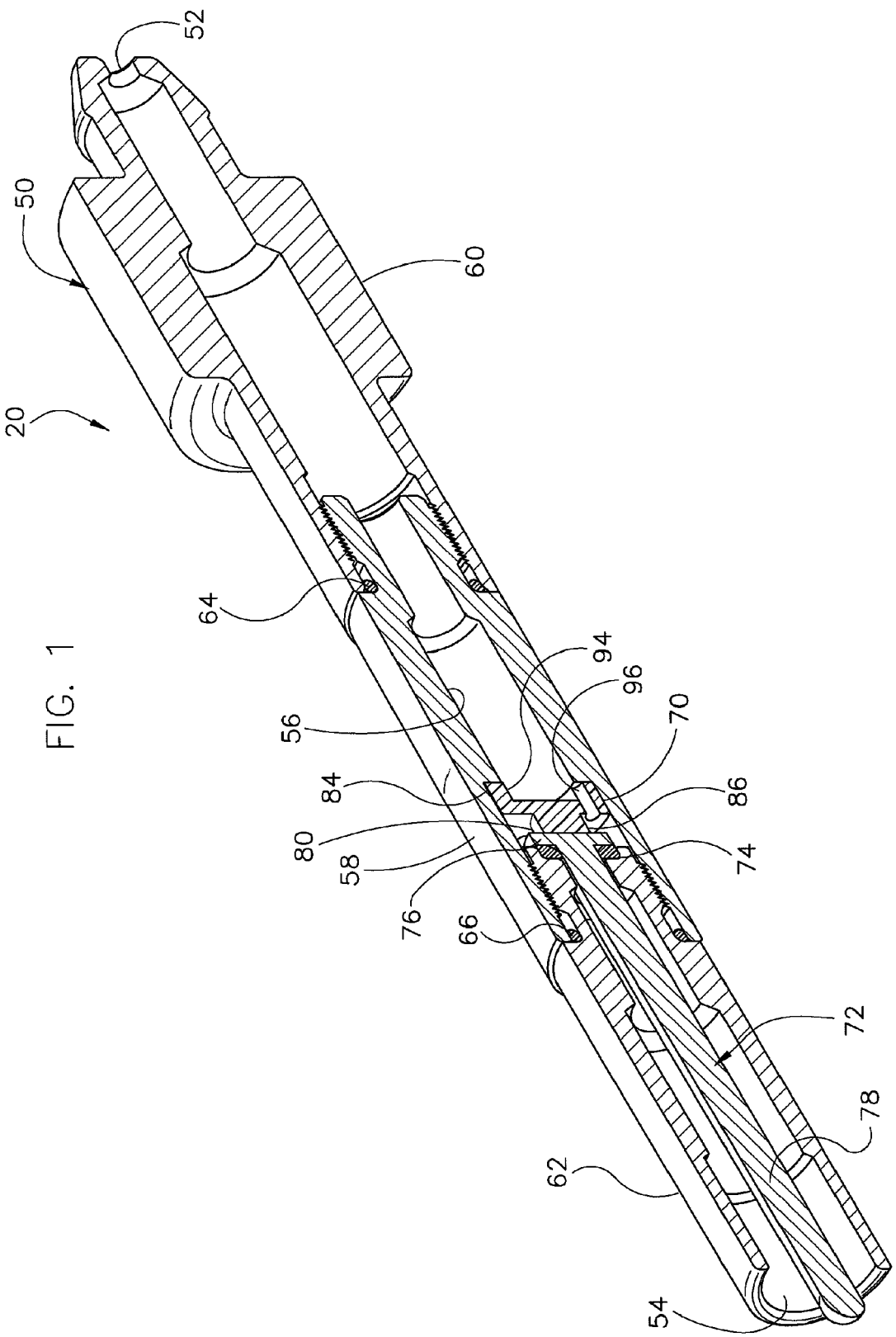
FIG. 1 is a partially cut away perspective view of an animal watering valve constructed in accordance with a first embodiment of the invention.
Figure 3A:
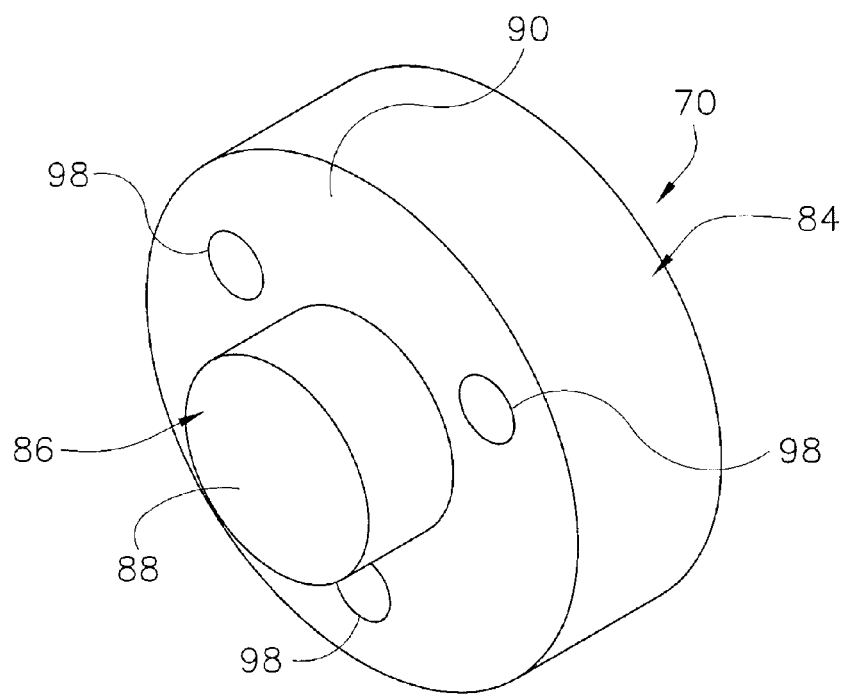
FIGS. 3A and 3B are downstream and upstream perspective views, respectively, of a diaphragm of the animal watering valve of FIGS. 1 and 2.
Figure 3B:
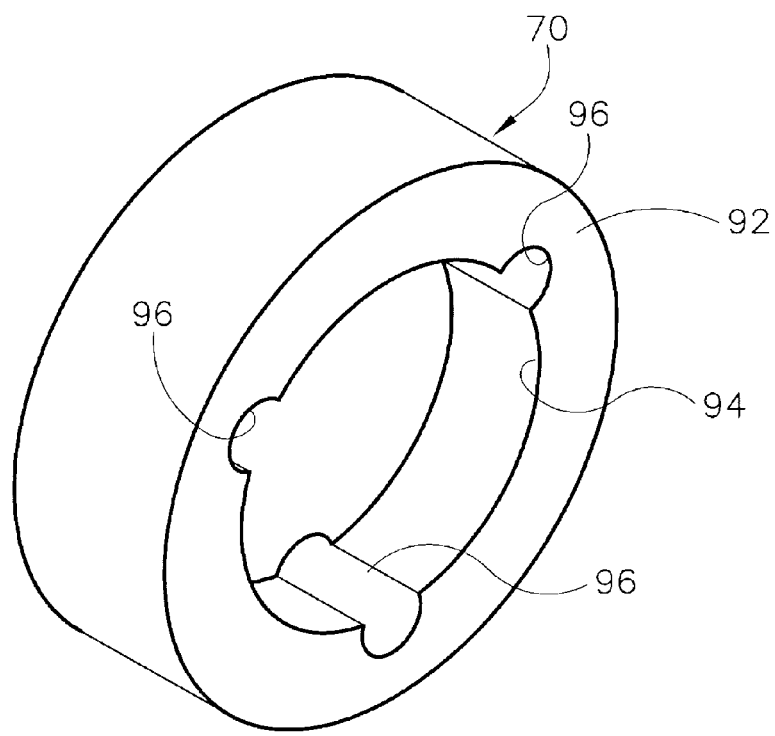
Figure 6:
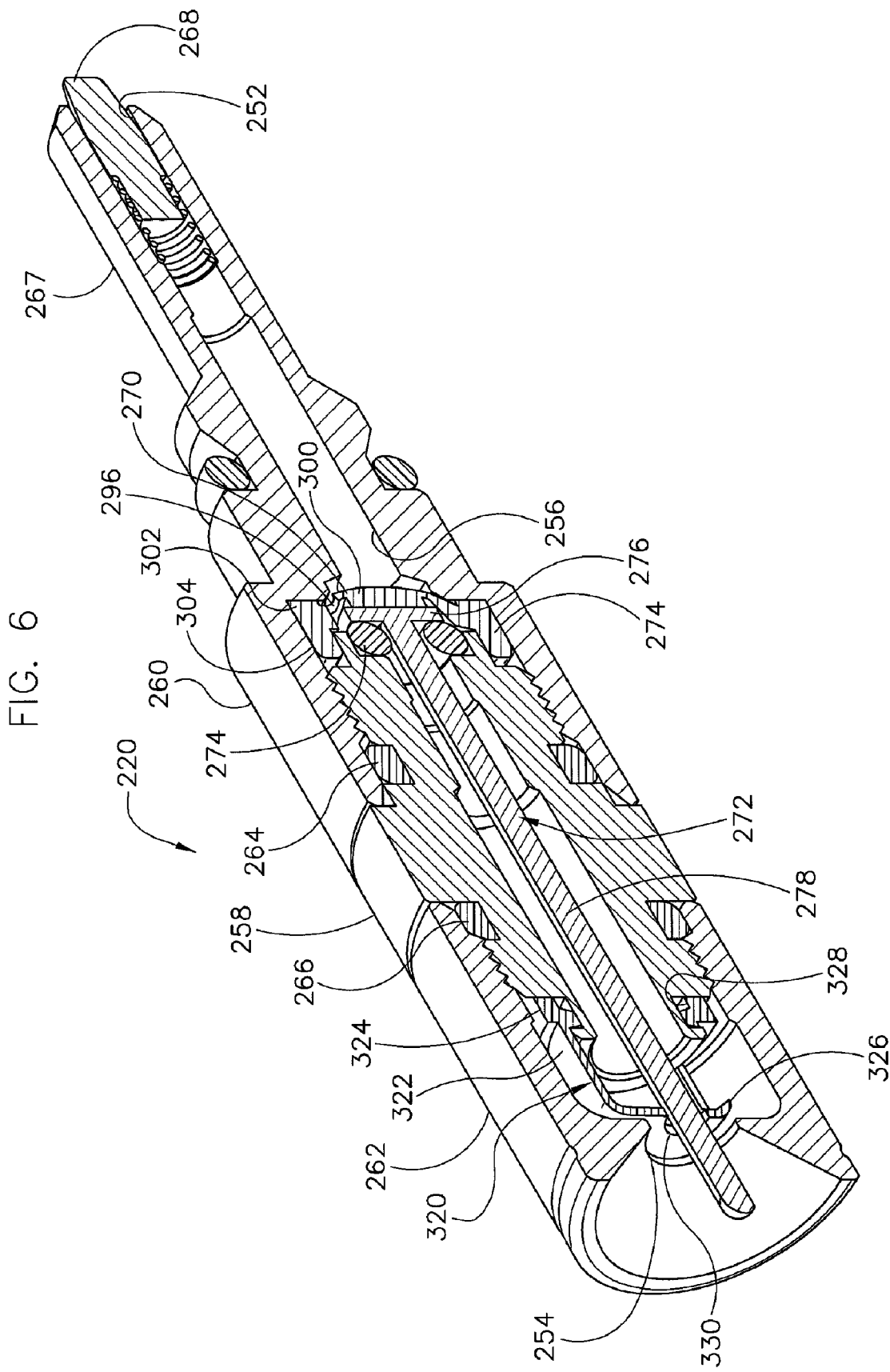
FIG. 6 is a partially cut-away perspective view of an animal watering valve constructed in accordance with a second preferred embodiment of the invention.

Two exemplary embodiments of diaphragm-type animal watering valves will now be disclosed, it being understood that many other embodiments falling within the claims are also contemplated.

1. System Overview and Construction and Operation of First Embodiment

Referring now to FIGS. 1-5B, an animal watering valve 20 is illustrated which has many applications and which is particularly useful in an animal watering bag such as the one disclosed in co-pending and commonly assigned patent application Ser. No. 10/940,282, the subject matter of which is incorporated by reference. The animal watering valve 20 includes a housing 50 having formed therein an inlet 52, an outlet 54, and an elongated longitudinal bore 56 extending from the inlet 52 to the outlet 54. In order to facilitate assembly, the housing 50 is preferably formed from three axially aligned pieces including a body 58 a valve cap 60 threaded onto an upstream end of the body 58, and a valve guard 62 threaded onto a downstream end of the body 58. O-rings 64 and 66 seal the body 58 to the valve cap 60 and the valve guard 62, respectively. A diaphragm 70, valve stem 72, and valve seat 74 are clamped between the body 58 and the valve guard 62.

The valve stem 72 forms a portion of a valve element for selectively sealing against a mating portion formed by the valve seat 74 and to provide an animal-accessible element for opening the valve. To this end, the valve stem 72 includes (1) a head 76 which is clamped between the diaphragm 70 and the valve seat 74 and (2) an elongated tail 78 extending longitudinally through the bore 56 beyond the outlet 54 into a recessed end of the valve guard 62. As best seen in FIGS. 4A and 5B, the head has an upstream surface 80 and downstream surface 82. The upstream surface 80 of the head 76 could be domed or curved but is preferably flat.

The valve seat 74 preferably comprises an elastomeric ring mounted in a counterbore in the upstream end of the valve guard 62. The ring has an upstream surface that seals against the downstream surface 82 of the valve stem head when the valve stem head 76 is in the seated position shown in FIGS. 4A and 4B. The valve seat 74 could be either O-shaped or D-shaped so long as it (1) provides a sealing surface for the head 76 of the valve stem 72 and (2) provides an engaging surface for the upstream end of the valve stem tail 78 for centering purposes.

The diaphragm 70 acts as a return member for the valve element formed by the valve stem head 76 and the valve seat 74. It is designed to (1) impose controlled, uniform return forces on the valve stem 72, (2) provide better control of fluid flow through the valve 20, (3) help center the valve stem 72 in the valve 20, and (4) help reduce the forces required to actuate the valve 20. Referring to FIGS. 3A-5B, the diaphragm 70 is formed from a unitary elastomeric element having an upstream body 84 and a downstream, radially centered, imperforate protrusion 86. The body has a diameter of 0.237 inches and a height of 0.08 inches. The protrusion 86 has a diameter of 0.100 inches and a height of 0.045 inches. It terminates in a planar downstream abutment surface 88 against which the upstream end 80 of the valve stem head 76 rests. The downstream surface 90 of the body 84 is planar from the outer surface of the protrusion 86 to the outer edge of the body 84. The upstream surface 92 of the body rests against a shoulder on the valve cap 60 at its outer portion is counterbored in its central portion to form a recess 94 having a diameter that is at least as large as the diameter of the protrusion 86. As best seen in FIG. 5B, recess 94 at least partially collapses upon valve actuation to permit the protrusion 86 to move away from the valve seat 74 to accommodate valve stem pivoting.

A number of circumferentially spaced apertures 96 are formed axially through the body 84 at the perimeter of the recess 94 and terminate in outlet ports 98 formed on the downstream surface 90 of the body 84. Three equally spaced apertures 96 are provided in the illustrated embodiment. Because the valve stem head 76 sits on the protrusion 86 rather than in a pocket, a significant gap is formed between the valve stem head 76 and the outlet ports, even when the valve stem 72 is in its fully actuated position as seen in FIG. 5B, leading to improved flow consistency in all ranges of valve stem deflection. Actuation forces are reduced when compared to a valve employing a diaphragm of the type disclosed in the Edstrom patent because the stem to abutment surface contact area is considerably reduced when compared to the diaphragm disclosed in the Edstrom patent.

In use, the animal watering valve 20 normally assumes the position illustrated in FIGS. 1-6 in which the valve stem 72 extends coaxially through the bore 56 with the head 76 being maintained in sealing contact with the seat 74 under the imposition of biasing forces supplied by the diaphragm 70. Water is supplied to the inlet 52 of the housing 50 but is prevented from flowing through the valve 20 by the sealing relationship between the head 76 of the valve stem 72 and the valve seat 74.

To actuate the valve 20, an animal deflects the tail 78 of the valve stem 72 using its snout, thus pivoting the head 76 against the diaphragm 70 and forming a gap "G" between the underside of the head 76 and the valve seat 74 as illustrated in FIGS. 5A and 5B. Actuation forces are reduced when compared to a valve employing a standard cup-type diaphragm because the reduced contact between the diaphragm 70 and the valve stem 72 results in less deflection of the diaphragm at full stroke. Water is then free to flow through the apertures 96 in the diaphragm 70, through the gap G, through the bore 56 in the valve housing 50, and out of the outlet 54 of the valve housing 50. During this pivoting motion, the center of the diaphragm body 84 distorts to permit the protrusion to collapse into the recess 94 as seen in FIG. 5B, hence lowering resistance to valve stem motion. Flow through the diaphragm 70 and around the valve stem head 76 is facilitated by the full porting of the apertures 96 and by the relatively large gap formed between the apertures outlets 98 and the valve stem head 76.

Upon release of the valve stem 72, the valve 20 closes automatically under the return forces imposed by the diaphragm 70.

It can thus be seen that the inventive valve, when compared to the previously known valves, requires reduced actuating forces, applies improved closing forces, provides improved flow rate control at given supply pressure and flow settings, and can be easily and simply adjusted to provide different flow rates at a given pressure setting without adversely affecting valve operation.

2. Construction and Operation of Second Embodiment

Referring to FIGS. 6-10B, an animal watering valve 220 is illustrated which differs from the animal watering valve 20 of the first embodiment primarily in that it has a different diaphragm and has a shield 320 not found in the animal watering valve 20 of the first embodiment. It is also configured for direct mounting in a cage and connection to a hard water bottle or an animal watering system rather than for connection to an animal watering bag and, accordingly, has a slightly different housing. Elements of valve 220 corresponding to those of the valve 20 of the first embodiment are thus designated by the same reference numeral, incremented by 200.

Valve 220 includes a housing 250 which houses a diaphragm 270, a valve stem 272, and a seat 274. The housing 250 has formed therein an inlet 252, an outlet 254, and an elongated longitudinal bore 256 extending from the inlet 252 to the outlet 254. The housing 250 is formed from a valve body 258, a valve cap 260 threaded onto an upstream end of the valve body 258, and a valve guard 262 threaded onto a downstream end of the valve body. The valve body 258 is sealed to the valve cap 260 and the valve guard 262 by O-rings 264 and 266, respectively. The upstream end of the valve cap 260 presents a shank 267 that is configured for mating with a docking mechanism (not shown) of an animal watering system. A spring loaded plug 268 is mounted in the upstream end of the shank 267 for preventing debris from entering the bore 256 when the valve 220 is disconnected from the docking mechanism. The diaphragm 270, valve stem 272, and valve seat 274 are clamped between the valve body 258 and the valve cap 260. As in the previous embodiment, the valve seat 274 comprises a ring retained in a counterbore on the upstream end of the valve body 258. Also as in the previous embodiment, the valve stem 272 includes a flat head 276 and an elongated tail 278 extending downstream through the bore 256 from the head 276. The head 276 has a flat upstream abutment surface 280 and a downstream sealing surface 282 (see FIGS. 9B and 10B).

Referring to FIGS. 8A-9B, the diaphragm 270 of this embodiment, like the diaphragm 70 of the first embodiment, is configured to improve flow consistency and reduce actuating forces. However, it is more similar to the diaphragm discussed above in connection with the Edstrom patent in that it has a cup in its downstream surface that receives the valve stem head 276. The diaphragm 270 is formed from a unitary elastomeric element, including a central web portion 300 and a cylindrical peripheral portion 302. The peripheral portion 302 has a cylindrical portion 304 extending downstream from the web portion 300. The portion 304 is clamped between a boss 306 on the valve body 258 and the inner periphery of the valve cap 260 to hold the diaphragm 270 in position without distorting the web portion 300. The upstream end of the peripheral portion 302 engages a shoulder 308 on the valve cap 260. The peripheral portion 302 thus provides a support via which the web portion can stretch 300 without undue distortion.

Figure 8A:
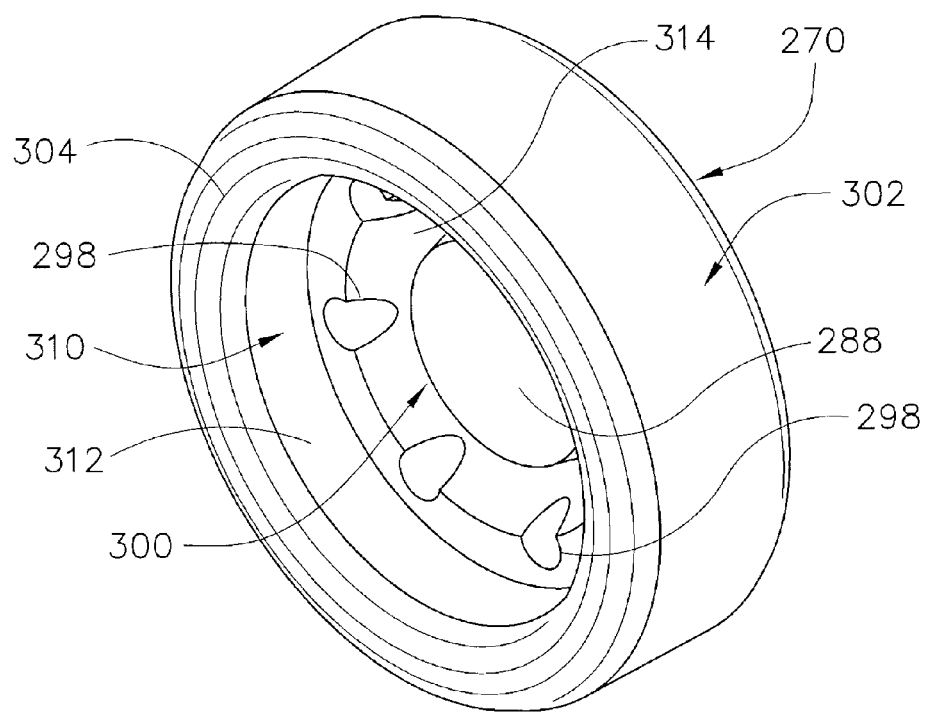
FIGS. 8A and 8B are downstream and upstream perspective views, respectively, of a diaphragm of the animal watering valve of FIGS. 6 and 7.
Figure 8B:
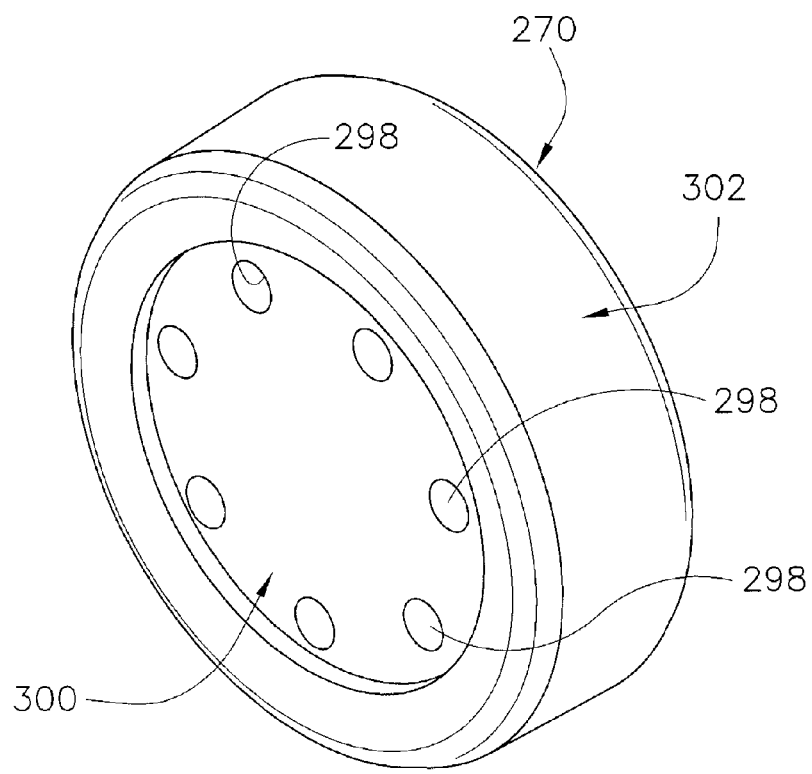
Figures 9A, 9B:
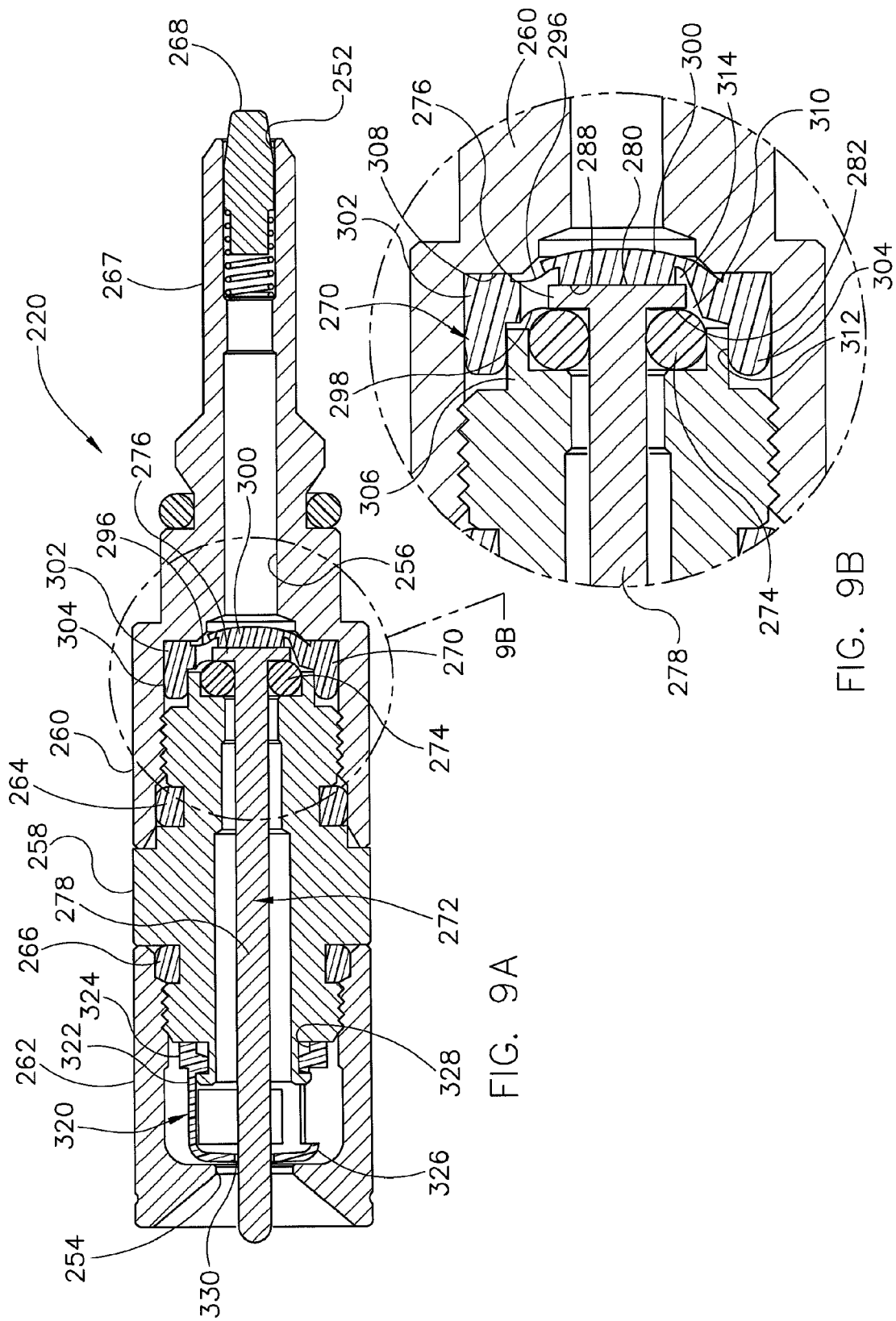
FIG. 9A is a sectional side elevation view of the animal watering valve of FIGS. 6 and 7, illustrating the valve in its seated or closed position.
FIG. 9B is an enlarged fragmentary view of a portion of FIG. 9A.

Still referring to FIGS. 8A, 8B, 9A, and 9B, the web portion 300 has apertures 296 formed therethrough for the passage of fluid and also has a recess 310 counterbored into the downstream surface thereof to form the pocket for receiving the valve stem head 276. A number (seven in the illustrated embodiment) of apertures 296 are spaced equidistantly around the web portion as best seen in FIGS. 8A and 8B. The downstream surfaces of the apertures 296 form outlet ports 298 that are located radially inwardly of and axially upstream of the upstream surface 280 of the valve stream head 276 as seen in FIGS. 9B and 10B. The outlet ports 298 are in direct contact with the installed valve stem head, thereby improving flow consistency. The recess 310 has an ID that is larger than the OD of the valve stem head 276 so that the head 276 does not engage the ID of the recess, at least in the seated position thereof. In addition, an upstream portion 312 of the ID of the recess 310 is inclined inwardly from the downstream end towards the upstream end thereof. The angle reduces the contact force between the diaphragm 270 and the outer diameter of the valve stem head 276, allowing the valve stem head 276 to move more freely. Flow consistency is further improved through the provision of a channel 314 bounded at its OD by the ID of the upper end portion of the recess 310. The channel 314 links the outlet ports 298 together to better distribute fluid flow past the valve stem head 276 should fluid flow through the apertures be none uniform. The channel 314 extends below the surface of the web portion 300, forming a raised abutment surface 288 against which the upstream surface 280 of the valve stem head 276 rests. The channel 314 also reduces the contact area between the diaphragm 270 and the valve stem head 276, thereby reducing the actuation forces required to open the valve 220. It also allows for reduction of the diaphragm displacement at full stem travel and reduces the leverage imposed on the stem by the diaphragm 270 without reducing the axial force. The diaphragm 270 of this embodiment has a diameter of 0.362 inches with the web portion having a diameter of 0.264 inches and the channel having a diameter of 0.208 inches. The abutment surface 286 has a diameter 0.135 inches—less than that of the valve stem head 276.

Figure 7:
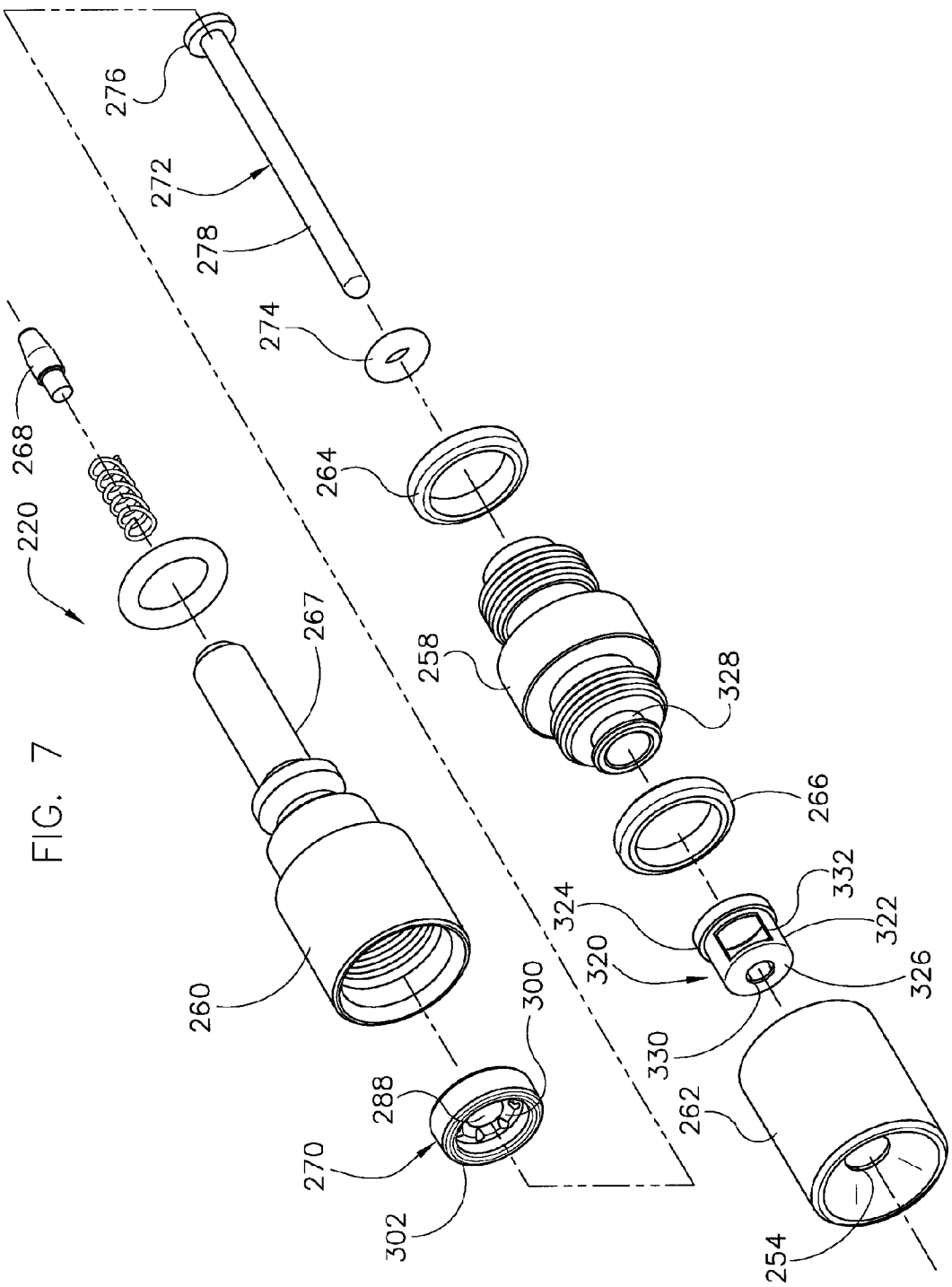
FIG. 7 is an exploded perspective view of the animal watering valve of FIG. 6.

Referring to FIGS. 7, 9A, and 10A, the purpose of the shield 320 is to prevent bedding material or other debris from being lodged in the bore 256 between the valve stem tail 78 and the side of the bore 256 and thus to prevent the valve 220 from being stuck in its open position. To this end, the shield 320 is formed from a unitary elastomeric cup-shaped member including a cylindrical body 322, a ring 324 extending radially outwardly from an upstream end portion of the body 322, and a membrane 326 covering a downstream end of the body 322. The ring 324 is retained in a shield retainer 328 extending axially from the downstream end of the valve body 258. The membrane 326 has a central aperture 330 formed therethrough which, the stem 272 passes. Unobstructed flow out of the valve 220 is also facilitated by an opening 332 formed in the cylindrical body 322 of the shield 320.

In use, the animal watering valve 220 normally assumes the position illustrated in FIGS. 1-6 in which the valve stem 272 extends coaxially through the bore 256 and through the center of the aperture 330 in the membrane 326 such that its head 272 is maintained in sealing contact with the valve seat 274 under the imposition of biasing forces supplied by the diaphragm 270. Water is supplied to the inlet 252 of the housing 250 but is prevented from flowing through the valve 220 by the sealing relationship between the head 276 of the valve stem 272 and the valve seat 274.

To actuate the valve 220, an animal inserts its snout into the frustoconical recess formed in the downstream end of the valve guard 262 and deflects the tail 278 of the valve stem 272, thus pivoting the head 276 against the diaphragm 270 and forming a gap "G" between the downstream surface of the valve stream head 276 and the valve seat 274 as best illustrated in FIG. 10B. Water is free to flow through the apertures 296 in the diaphragm 270, through the gap "G", through the bore 256 in the valve housing 250, between the valve stem tail 278 and the now enlarged aperture 330 in the membrane 326 of the shield 320 (and also through the aperture 332 in the side of the body 322 and past the OD of the membrane 326), and out of the outlet 254 of the valve housing 250. Because the outer diameter of the valve stem head 276 does not contact the diaphragm to the extent that it would with a diaphragm of the type disclosed in the Edstrom patent, valve actuation forces are reduced. Upon release of the valve stem 272, the valve 220 closes automatically under the return forces imposed by the diaphragm 270.

Of course, many changes and modifications could be made to the present invention without departing from the spirit thereof, and the scope of such changes will become apparent from a reading of the appended claims.

I claim:

1. An animal watering valve comprising:
   A. a housing which has a longitudinal bore formed therein having an upstream inlet and a downstream outlet;
   B. a valve seat which is disposed in said bore;
   C. an elastomeric diaphragm which is disposed in said bore upstream of said valve seat and which includes
      (1) a perforated portion having apertures formed therethrough that have outlets, and
      (2) a seat portion having a valve stem head abutment surface, wherein said diaphragm includes a body through which said apertures extend and a radially central protrusion which extends axially downstream from a downstream surface of said body to said abutment surface; and
   D. a valve stem which is located in said bore and which extends from said diaphragm toward said outlet, said valve stem having a head that is clamped between said diaphragm and said valve seat and a tail that is laterally deflectable to move said valve stem head relative to said diaphragm from a seated position in which said valve stem head seals against said valve seat to prevent water flow though said valve to an unseated position in which said valve stem head pivots relative to said valve seat to permit water to flow through said apertures in said diaphragm, between said valve stem head and said valve seat, and out of said valve, said valve stem head having an upstream surface that abuts said seat portion of said diaphragm, wherein at least portions of said flow aperture outlets are located radially inwardly of and axially upstream of said upstream surface of said valve stem head when the valve stem tail is in both the deflected and undeflected positions thereof.

2. The animal watering valve of claim 1, wherein said valve stem head has an outer radial peripheral surface that is free of contact from said diaphragm in the seated position of said valve stem head.

3. The animal watering valve of claim 1, wherein said upstream surface of said valve stem head is at least essentially planar.

4. The animal watering valve of claim 1, wherein said valve seat is an elastomeric ring that has an upstream surface contacting a downstream surface of said valve stem head.

5. The animal watering valve of claim 1, wherein said valve seat is an O-ring.

6. The animal watering valve of claim 1, wherein portions of said flow aperture outlets are located radially outwardly of said upstream surface of said valve stem head.

7. The animal watering valve of claim 1, wherein said protrusion is imperforate.

8. The animal watering valve of claim 1, wherein said downstream surface of said diaphragm body is at least essentially planar from an outer radial surface of said protrusion to an outer radial surface of said diaphragm, at least when said valve stem is in said unseated position thereof.

9. The animal watering valve of claim 1, wherein said body of said diaphragm has a recess formed in an upstream surface thereof having a diameter that is at least as large as a diameter of said protrusion, and wherein said recess at least partially collapses upon valve stem deflection.

10. The animal watering valve of claim 1, wherein radial deflection of said valve stem is constrained by engagement of said valve stem with an inner radial surface of said valve seat.

11. The animal watering valve as defined in claim 1, wherein said diaphragm includes
    a perforated web portion having a downstream surface which presents said seat portion and which has apertures formed therethrough, and
    a cylindrical peripheral portion which extends axially downstream from said web portion and which clamped in place within said valve housing.

12. The animal watering valve of claim 11, wherein an annular channel is formed in said perforated web portion of said diaphragm, extends around an outer radial periphery of said seat portion, and connects the outlets of said apertures to one another.

13. The animal watering valve of claim 12, wherein said perforated web portion includes an annular portion that is disposed radially between said channel and said cylindrical portion and that is located axially downstream of said seat portion, and wherein said channel has an outer peripheral surface that is inclined radially inwardly from an outer axial end portion thereof toward an inner axial end portion thereof.

14. The animal watering valve of claim 13, wherein said outer peripheral surface of said channel constrains radial deflection of said valve stem when said valve stem is in the unseated position thereof.

15. An animal watering valve comprising:
    A. a housing which has a longitudinal bore formed therein and which has an upstream inlet and a downstream outlet;
    B. an annular elastomeric valve seat which is disposed in said bore;
    C. an elastomeric diaphragm which is disposed in said bore upstream of said valve seat and which includes
       (1) a body having apertures formed therethrough, each of the apertures having an upstream inlet opening and a downstream outlet opening, and
       (2) an imperforate radially central protrusion which extends axially downstream from a downstream surface of said body and which forms a seat portion on a downstream end thereof;
    (D) a valve stem which is located in said bore and which extends from said diaphragm toward said outlet, said valve stem having a head that is clamped between said diaphragm and said valve seat and a tail that is laterally deflectable to move said valve stem head relative to said diaphragm from a seated position in which said valve stem head seals against said valve seat to prevent water flow though said valve to an unseated position in which water flows through said apertures of said diaphragm, between said valve stem head and said valve seat, and out of said valve, said valve stem head having an upstream surface that abuts said seat portion of said diaphragm, wherein at least portions of said flow aperture outlets are located radially inwardly of and axially upstream of said upstream surface of said valve stem head.

16. The animal watering valve of claim 15, wherein said downstream surface of said diaphragm body is at least essentially planar from an outer radial surface of said protrusion to an outer radial surface of said diaphragm, at least when said valve stem is in said seated position thereof.

17. The animal watering valve of claim 15, wherein said body of said diaphragm has a recess formed in an upstream surface thereof and having a diameter that is at least as large as a diameter of said protrusion, and wherein said recess at least partially collapses upon deflection of said valve stem from said seated position thereof to said unseated position thereof.

18. The animal watering valve as recited in claim 15, wherein radial deflection of said valve stem is constrained by engagement of said valve stem with an inner radial surface of said valve seat.

* * * * *